United States Patent [19]

Pellolio, Jr.

[11] Patent Number: 4,602,814
[45] Date of Patent: Jul. 29, 1986

[54] SAFETY LATCH FOR LIFTING HOOKS

[75] Inventor: Anselmo P. Pellolio, Jr., Cotati, Calif.

[73] Assignee: E. D. Bullard Company, Sausalito, Calif.

[21] Appl. No.: 684,807

[22] Filed: Dec. 21, 1984

[51] Int. Cl.⁴ ............................................. A44B 13/02
[52] U.S. Cl. ................................ 294/82.19; 24/241 P
[58] Field of Search ............... 294/82.19, 82.2, 82.22; 24/231 R, 241 P, 241 PL, 241 PP, 241 PS, 241 R, 241 S, 241 SB

[56] References Cited

U.S. PATENT DOCUMENTS

| 2,196,460 | 4/1940  | Hertel   | 294/82    |
| 2,791,817 | 5/1957  | Burnham  | 24/241    |
| 2,978,766 | 4/1961  | Arnett   | 24/241 P  |
| 3,003,214 | 10/1961 | Geraghty | 24/241    |
| 3,121,274 | 2/1964  | Evans    | 24/241    |
| 3,121,275 | 2/1964  | Evans    | 24/241    |
| 3,121,276 | 2/1964  | Evans    | 24/241    |
| 3,344,489 | 10/1967 | Raschke  | 24/241    |
| 3,367,001 | 2/1968  | Raschke  | 24/241    |
| 3,368,250 | 2/1968  | Raschke  | 24/241    |
| 3,430,307 | 3/1969  | Burnham  | 24/241    |
| 3,480,319 | 11/1969 | Raschke  | 294/82    |
| 3,568,269 | 3/1971  | Moretti  | 24/241    |
| 3,611,515 | 10/1971 | Raschke  | 24/241    |
| 3,674,301 | 7/1972  | Crook, Jr. | 294/82  |
| 4,305,181 | 12/1981 | Pellolio | 24/241    |
| 4,434,536 | 3/1984  | Schmidt et al. | 24/241 P |

Primary Examiner—James B. Marbert
Attorney, Agent, or Firm—Thomas M. Freiburger

[57] ABSTRACT

An improved safety latch suitable for use on grab as well as other types of lifting hooks. A hollow, generally rectangular, annular latch member surrounds the heel of the hook with the side walls of the latch member providing an L-shape configuration. The latch member is mounted on the heel of the hook for rotation about an axis extending transversely of the hook at the end of the foot of the L-shape configuration. The foot of the L-shape configuration has a length greater than the width of the throat of the hook and resilient means are provided for urging the latch member to rotate about the mounting axis to cause the leg of the L-shape configuration to extend across the throat of the hook whereby the end of the latch member at the foot of the L-shape configuration is adjacent the tip of the hook when the other end of the latch member is in contact with the exterior surface of the basket portion of the hook.

4 Claims, 10 Drawing Figures

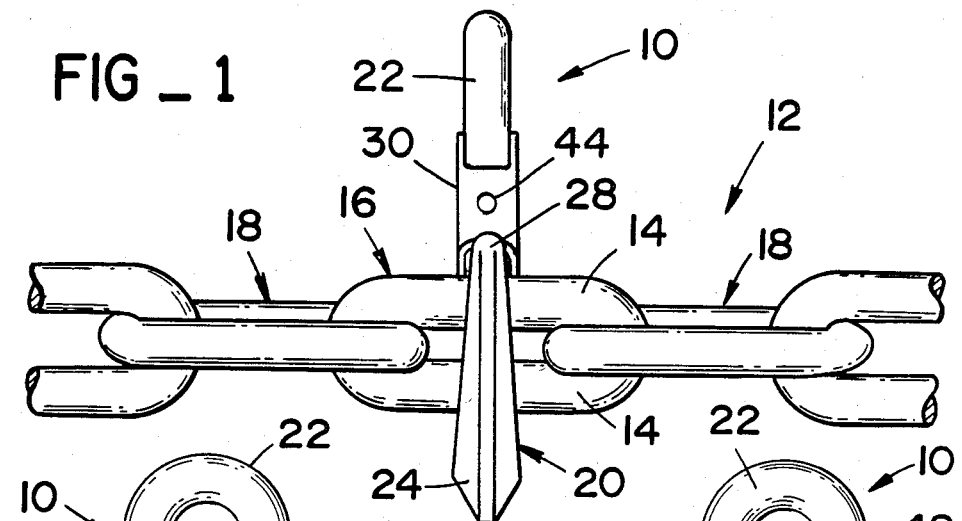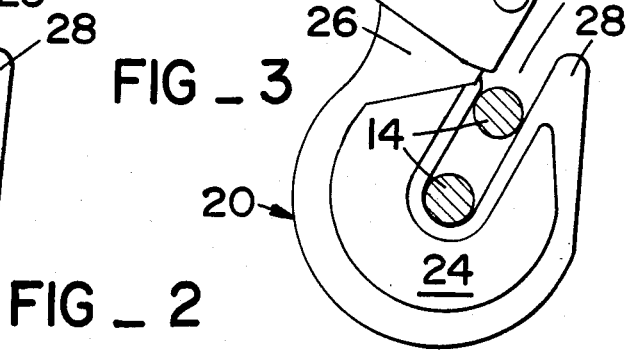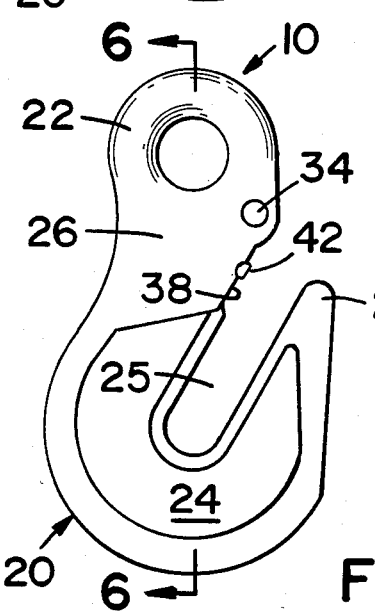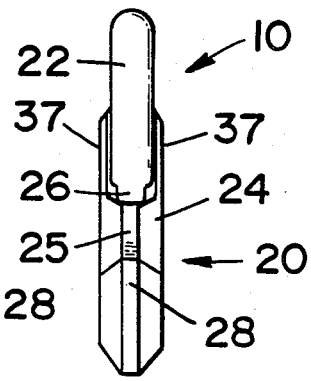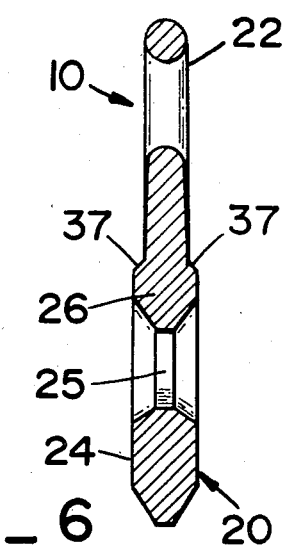

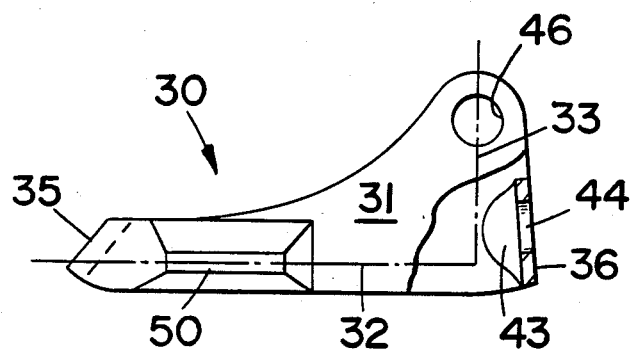
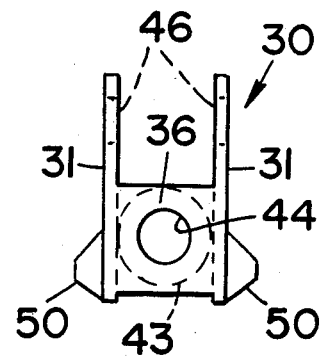
FIG_7  FIG_9
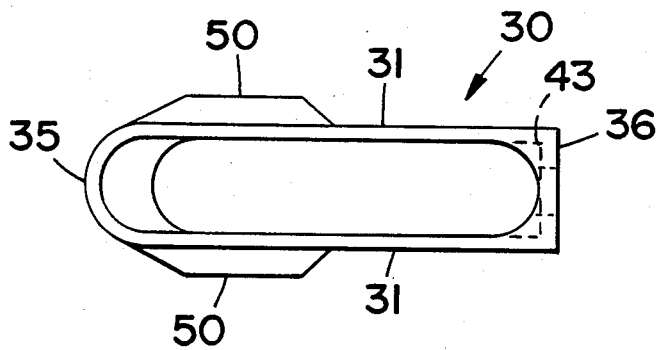
FIG_8
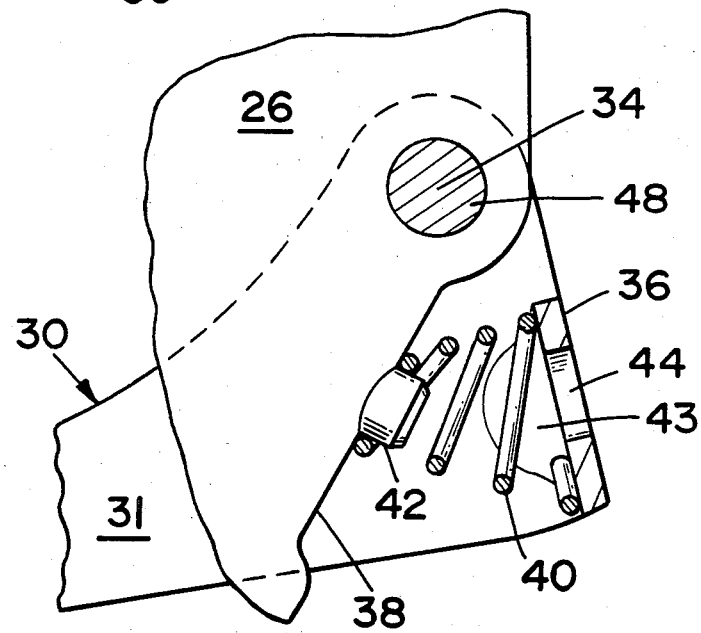
FIG_10

SAFETY LATCH FOR LIFTING HOOKS

BACKGROUND OF THE INVENTION

1. Field of the Invention

This invention relates to safety latches for hooks used in hoisting cargo and the like and more particularly to an improved safety latch structure suitable for use on grab hooks adapted to receive link type chain as well as on conventional lifting hooks adapted to receive cables and the like.

2. Description of Related Art

The use of safety gates or latches on lifting hooks of conventional design is well known in the prior art. Such gates or latches have generally been mounted for rotation about the axis of the shank of the hook from a closed position extending across the throat of the hook to an open position extending to one side of the throat to allow insertion or removal of a cable or the like. Such gates or latches must be opened manually for both insertion and removal of a cable or the like. In their open position, such gates or latches project from one side or the other of the hook.

Many of the gates or latches known in the prior art have been designed to close automatically as by spring loading. However, they have also required some means for locking them in their closed position and thus they have included multiple parts and mechanisms which added cost and complication in manufacture as well as making them prone to damage in use.

The gate or latch structures of the prior art have not been suitable for use on "grab" hooks. Grab hooks are designed to snugly receive both sides of one link of a conventional chain, thus locking the hook between the two adjacent links of the chain to avoid slippage of the hook along the chain. A gate or latch structure which projects from the side of a hook in its open position will tend to interfere with one of the links of the chain adjacent the link to be received in the hook. Such interference will tend to result in damage to the gate or latch under heavy load conditions and more importantly, since the gate or latch must be manually opened, such interference will greatly increase the danger of injury to the operator when a chain is being loaded onto a grab hook.

It is an object of this invention to provide a safety latch for a lifting hook which is capable of opening and closing automatically during loading with no portion of the latch projecting from a side of the hook in either the open or closed position.

It is a further object of this invention to provide a safety latch which is particularly suited for use on a grab hook.

It is another object of this invention to provide a safety latch which has a minimum of parts and is simple and inexpensive to manufacture, as well as being rugged and dependable in use under heavy load conditions.

SUMMARY OF THE INVENTION

According to this invention, an improved safety latch is provided on a lifting hook having an eye and a body with a basket portion defining an elongated open throat. The hook body includes a heel portion interposed between the eye and the basket portion thereof with the basket portion terminating in a tip portion on the opposite side of the open throat from the heel portion. The hook body is generally planar as established by the axis of elongation of the elongated open throat together with the heel portion and tip portion of the hook body. The improved safety latch comprises a hollow annular latch member surrounding the heel portion of the hook body and means mounting the annular latch member on the heel portion of the hook body for rotation about an axis transverse to the planar hook body. Means are provided for resiliently urging rotation of the annular latch member about such axis to cause one portion thereof to extend between the heel portion and the tip portion of the hook body when the opposite portion of the annular latch member is in contact with the exterior surface of the basket portion of the hook body.

BRIEF DESCRIPTION OF THE DRAWING

This invention will be more fully understood from a reading of the following detailed description of a preferred embodiment thereof in conjunction with the appended drawings wherein:

FIG. 1 is a front view in elevation of a grab hook to which this invention is applicable, shown in lifting engagement with a chain.

FIG. 2 is a side view in elevation of the grab hook of FIG. 1 with an engaged chain link shown in cross section and with a safety latch according to a preferred embodiment of this invention shown in its closed position.

FIG. 3 is a view similar to FIG. 2 but showing the safety latch in its open position.

FIG. 4 is a view similar to FIG. 2 but omitting the safety latch member and the chain link.

FIG. 5 is a plan view in elevation looking into the open throat of the grab hook of FIGS. 1–4 with the safety latch member removed.

FIG. 6 is a cross-sectional view taken along line 6—6 of FIG. 4 with the safety latch member removed.

FIG. 7 is an enlarged side view in elevation of a safety latch member according to a preferred embodiment of this invention.

FIG. 8 is a plan view in elevation of the safety latch member of FIG. 7 taken from the bottom.

FIG. 9 is a front view in elevation of the safety latch member of FIGS. 7 and 8.

FIG. 10 is an enlarged fragmentary view in elevation of the joint between the safety latch member of this invention and the hook. FIG. 10 is partially broken away to show in cross-section a preferred spring means urging the safety latch member toward its closed position.

DETAILED DESCRIPTION OF PREFERRED EMBODIMENT

Referring to FIGS. 1 and 2, a grab hook 10, to which this invention is applicable, is shown in lifting engagement with a chain 12. As best shown in FIG. 1, both of the sides 14 of a link 16 of the chain 12 are received in the hook. Thus the hook 10 is locked between the links 18 at opposite ends of the link 16 against longitudinal slippage along the chain 12.

As best shown in FIG. 2, the hook 10 comprises a generally planar integral body made of tempered steel or the like. The hook 10 is provided with a lifting eye 22 which is preferably made integrally with the hook body 20 for grab hook purposes but which may be attached to the hook body by a swivel arrangement in other applications. The hook body 20 includes a basket portion 24 defining an elongated open throat 25 dimensioned to snugly receive both sides 14 of a chain link 16. The hook body 20 also includes a heel portion 26 interposed between the basket portion 24 and the eye 22 as well as a tip portion 28 at the opposite side of the open end of the throat 25 from the heel portion 26.

As best shown in FIG. 3, the heel portion 26 and tip portion 28 of the body 20 of the grab hook 10 provide entrance abutments for the sides 14 of a chain link 16 in order to facilitate the entrance of the link 16 into the throat 25 of the hook 10. It is necessary that the sides of the throat 25 be smooth and straight in order to avoid binding of the link 16 as it is received in or removed from throat 25.

Referring to FIG. 1, it is also necessary that there be no projections from the sides of the generally planar hook 10 to engage the links 18 of the chain 12 adjacent the link 16 which would interfere with the insertion and removal of the link 16. It will be understood that the hook 10 and chain 12 are subjected to forces under heavy load conditions that make it essential for the link 16 be properly seated in the throat 25 to avoid destructive effects on the hook 10, chain 12 and anything projecting therefrom or interposed therebetween.

Referring to FIGS. 2 and 3, a safety latch 30 according to the teaching of this invention is shown as applied to the hook 10. In FIG. 2, the safety latch 30 is shown in its closed position to prevent the accidental or undesired release of the chain link 16 from the throat 25 of the hook 10. In FIG. 3, the safety latch 30 is shown in position for the insertion or removal of the chain link 16 from the throat 25 of the hook 10.

As best shown in FIGS. 4 and 7 through 9, the safety latch member 30 according to this invention comprises a unitary, hollow, generally rectangular, annular body made of tempered steel or the like and dimensioned to snugly surround the heel portion 26 of the hook 10.

Referring to FIGS. 7 through 9, the sides 31 of the latch member 30 according to this invention provide a generally L-shaped configuration as indicated by axis lines 32 and 33. The leg portion 32 of the L-shaped configuration is dimensioned to extend from the tip portion 28 of the hook body 20 to the exterior surface of the basket portion 24 of the hook body 20. The foot portion 33 of the L-shaped configuration has a length which is greater than the width of the throat 25 defined by the hook body 20. The latch member 30 is mounted on the heel portion 26 of the hook body 20 for rotation about an axis 34 at the end of the foot portion 33 of the L-shaped configuration.

The end wall 35 of the annular latch member 30 at the free end of the leg portion of the L-shaped configuration is designed to engage the exterior surface of the basket portion 24 of the hook body 20 when the latch member 30 is in its closed position as shown in FIG. 2. In such position the leg portion 32 of the L-shaped configuration extends across the heel portion 26 and throat 25 of the hook body into close proximity with the tip 28 thereof. In such position, the leg portion 32 of the latch member 30 will rigidly block the open end of the throat 25 preventing the removal of a link 16 from the throat since counterclockwise rotation of the latch member 30 is prevented by the engagement of the end 35 thereof with the exterior surface of the basket portion 24 of the hook body 20 as shown in FIG. 2. Forces applied to the latch member 30 by the link 16 will be distributed between the end 35 of the latch member and the axis of rotation 34 thereof.

The end 36 of the annular latch member 30 at the foot portion of the L-shaped configuration thereof serves as a camming surface for automatically rotating the latch member 30 in a clockwise direction to its open position as shown in FIG. 3 upon insertion of a link 16 into the throat 25 of the hook 10. In addition, the latch member 30 may be rotated to its open position by manually gripping the leg portion 32 of the L-shaped configuration and rotating such leg portion 32 upwardly toward the eye 22 of the hook 10 as shown in FIG. 3 of the drawing.

From the above it will be understood that the latch member 30 will not project from the sides of the hook 10 in either the open or closed positions thereof. Instead, the latch member will tend to project slightly from the rear of the hook 10 when in its open position as shown in FIG. 3 and to snugly engage the body 20 of the hook 10 in its normally closed position as shown in FIG. 2.

In the preferred embodiment of this invention as shown in FIGS. 5 and 6, the sides of the heel portion 26 of the hook body 20 may be recessed as indicated by the shoulders 37 to receive the latch member 30. Thus such shoulders 37 will provide a smooth transition from the exterior surface of the hook body 20 to the exterior surface of the latch member 30 thereby tending to avoid any accidental rotation of the latch member 30 toward its open position.

Similarly, the inner surface of the throat 25 may be provided with a recess 38 to receive the end 36 of the latch member 30. Thus, as best shown in FIG. 2, the smooth entry into the elongated throat 25 defined by the hook body 20 will be preserved. As a result, the chance of any fouling of the chain 12 with the latch member 30 or the binding of a link 16 of the chain 12 upon entry into or removal from the throat 25 will be minimized, thereby avoiding damage to the safety latch even under heavy load conditions.

According to this invention, latch member 30 is resiliently urged to its closed position. In the preferred embodiment of the invention as best shown in FIG. 10, a compression spring 40 is interposed between the end 36 of the latch member 30 and recess 38 in the throat 25. A conical compression spring 40 is preferred, with a post 42 being provided to be received in the truncated apex of the spring 40. The base of the spring 40 may be received in an appropriate depression 43 in the interior surface of the end 36 of the latch member 30 to insure that the spring 40 will not become dislodged in use. In addition, an aperture 44 may be provided through the end 36 of the latch member 30 to receive the post 42 when the spring 40 is fully compressed, thus insuring that the end 36 of the latch member 30 will be fully received in the recess 38 to preserve the smooth entry opening of the throat 25.

In the preferred embodiment of the invention shown in the drawing, the latch member 30 is mounted to the heel portion 26 of the body 20 by means of holes 46 which are received over the ends of a pivot pin 48 which may be press fit through the hook body 20. The axis 34 of the pivot pin 48 provides the axis of rotation for the latch member 30 and the pivot pin 48 is preferably of substantial crosssectional dimensions in order to withstand the forces encountered in use.

It is believed that those skilled in the art will make obvious modifications in the embodiment of this invention as shown in the drawings and described hereinabve. For example, any form of resilient means may be used to urge the latch member 30 to its closed position. Torsion springs may be mounted about the pivot pin 48, for example, with the legs thereof in engagement with the inner surface of the end 36 of the latch member 30 and the recess 38. The shape of the latch member may be modified in many respects without departing from the teaching of this invention. In the embodiment of the safety latch member shown in FIGS. 7-9, the exterior surfaces of the sides 31 of latch member 30 are provided with bosses 50 to facilitate the manual opening of the latch member 30 without substantially increasing the danger of accidental opening of the latch member 30. Other similar modifications may be made without departing from the scope of the following claims.

What is claimed is:

1. In a safety hook having an eye and a generally planar hook body of relatively narrow profile and including a basket portion defining an elongated open throat, the body also including a heel portion between the eye and the basket portion, and the basket portion terminating in a tip portion on the opposite side of the open throat from the heel portion, the improvement comprising a generally annular latch member continuous around its periphery and closely surrounding the heel portion of the hook body, pivot means mounting the latch member on the hook body for rotation on an axis transverse to the plane of the generally planar hook body, spring means urging rotation of the latch member so as to extend a closure portion of the latch member across and close the open throat of the basket portion to contain the entire width of a link of a chain within the open throat, and means associated with the latch member and the hook body for limiting the pivoting motion of the latch member and defining the closed position of the latch member by contact between the latch member and the hook body.

2. A safety hook in accordance with claim 1, wherein the latch member is so configured that even under reverse loading wherein the chain link is pushed toward the open end of the throat, the latch may be manually forced open without tending to push the chain link farther inwardly of the basket, so that the latch may be opened even under heavy reverse loading.

3. A safety hook in accordance with claim 2, wherein the axis of rotation of the latch member is positioned generally above the open throat and adjacent to the eye, with said closure portion of the latch member being generally below the axis of rotation and having a surface extending across the throat which is so contoured and inclined and so positioned with respect to the axis of rotation that the closure portion does not move farther into the throat as the latch member is pivoted toward the open or unlatched position, avoiding a tendency toward inward camming of the chain link as the latch is opened.

4. A safety hook in accordance with claim 3, wherein the closure portion of the latch member includes an upwardly curving end portion which approaches the tip portion of the hook body when the latch is in closed position.

* * * * *